Patented Nov. 5, 1929

1,734,595

UNITED STATES PATENT OFFICE

JOHN D. MORGAN, OF MAPLEWOOD, NEW JERSEY, ASSIGNOR TO DOHERTY RESEARCH COMPANY, OF NEW YORK, N. Y., A CORPORATION OF DELAWARE

BONDED REFRACTORY

No Drawing. Application filed February 17, 1927. Serial No. 169,149.

This invention relates to the manufacture of highly refractory articles and has for its object to provide a new bonding material for zirconium minerals such as zircon and zirconia but more particularly for zircon.

I have discovered that a mixture of zircon and monazite sand when bonded in accordance with the present invention forms a strong, hard and dense refractory material which will withstand very high temperatures without deterioration.

Monazite sand consists chiefly of a phosphate of calcium, lanthanum, yttrium and other rare-earth metals with varying amounts of thorium phosphate and thorium silicate. Zircon, as is well known, is zirconium silicate and is found as such in a natural state.

In accordance with the present invention, I mix zircon and monazite sand in varying proportions, treat the aggregate with a mineral acid, preferably sulphuric acid, and fire the mixture to a bonding temperature. The phosphates become sulphates with the release of phosphoric acid which in turn breaks down to phosporus pentoxide. The $P_2O_5$ in a manner not clearly understood causes the zircon particles to cohere. I am aware that phosphoric acid has been proposed as a bonding agent for zircon and I therefore do not claim such use broadly. However I do claim that the use of monazite sand as a source of the phosphates from which the phosphoric acid is derived is new and original with me. Monazite sand in addition to furnishing phosphoric acid produces other reaction products which cooperate with the phosphoric acid to form a stronger bond than can be obtained by the use of phosphoric acid alone. The sulphates resulting from the reaction finally become oxides as the firing proceeds and these oxides act as an additional bond for the zircon particles. Additionally the oxides fill the voids between the zircon particles and serve to make the refractory denser and harder and materially increase the compressive strength of the finished product.

The zircon particles may consists of natural size grains but an aggregate of natural size grains and fines in preferably about equal proportions is preferred inasmuch as a denser and stronger product is then obtained. The monazite is preferably added to the zircon as a fine powder.

The amount of monazite added to the zircon may vary considerably but the best results are indicated when it constitutes from 20% to 40% of the mixture. The amount of acid added should be enough to release the $P_2O_5$ content of the monazite. The preferred acid for releasing the phosphoric acid is sulphuric acid.

Depending on the amount of monazite added to the zircon the shrinkage characteristic of zircon refractories can be substantially or materially neutralized. This seems to be due in part at least to the rare-earth oxides of the monazite filling the voids which would otherwise exist.

The temperature of firing may vary within quite wide limits. It is preferred however to fire the mass between temperatures ranging from 1200° F. to 2500° F.

What is claimed is:

1. A refractory aggregate comprising a mixture of zirconium mineral and monazite sand.

2. A refractory aggregate comprising a mixture of zirconium mineral and monazite sand, said sand constituting from 20% to 40% of the article.

3. A refractory aggregate comprising a mixture of zircon and monazite sand.

4. A refractory article comprising a mixture of zircon and monazite sand as modified by the action of a mineral acid and bonding by heat.

5. A refractory article comprising a bonded mass of zircon and the oxides of the metals present in monazite sand.

6. A method of making refractory articles from a mixture of a zirconium mineral and monazite sand comprising treating the mixture with a mineral acid and firing the mixture.

7. A method of making refractory articles from a mixture of zircon and monazite sand comprising treating the mixture with a mineral acid and firing the mixture.

8. A method of making refractory articles from zircon and monazite sand comprising treating said sand with a mineral acid and firing.

9. A method of making refractory articles from zircon and monazite sand comprising forming a mixture of said materials whereof said sand constitutes from 20% to 40% of the mixture, treating the mixture with sulphuric acid, and firing the mixture.

In testimony whereof I affix my signature.

JOHN D. MORGAN.